US010876869B2

(12) United States Patent
Xu et al.

(10) Patent No.: US 10,876,869 B2
(45) Date of Patent: Dec. 29, 2020

(54) KALMAN FILTER BASED ANTI-TRANSIENT-IMPACT-VIBRATION-INTERFERENCE SIGNAL PROCESSING METHOD AND SYSTEM FOR VORTEX FLOWMETER

(71) Applicant: HEFEI UNIVERSITY OF TECHNOLOGY, Hefei (CN)

(72) Inventors: Kejun Xu, Hefei (CN); Chunli Shao, Hefei (CN); Zhangping Shu, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 310 days.

(21) Appl. No.: 15/955,720

(22) Filed: Apr. 18, 2018

(65) Prior Publication Data

US 2018/0231406 A1 Aug. 16, 2018

Related U.S. Application Data

(63) Continuation of application No. PCT/CN2016/079350, filed on Apr. 15, 2016.

(30) Foreign Application Priority Data

Feb. 23, 2016 (CN) .......................... 2016 1 0099983

(51) Int. Cl.
*G01F 1/32* (2006.01)

(52) U.S. Cl.
CPC .......... *G01F 1/3263* (2013.01); *G01F 1/3209* (2013.01); *G01F 1/329* (2013.01); *G01F 1/32* (2013.01)

(58) Field of Classification Search
CPC ........ G01F 1/32; G01F 1/3263; G01F 1/3209; G01F 1/329
See application file for complete search history.

(56) References Cited

FOREIGN PATENT DOCUMENTS

CN 101476906 A * 7/2009
CN 104729591 A * 6/2015
(Continued)

OTHER PUBLICATIONS

Akresh et al, Flow Measurement using Kalman Filter for Smoothing Vortex Shedding Frequency (Year: 2010).*
(Continued)

*Primary Examiner* — Gregory J Toatley, Jr.
*Assistant Examiner* — Lynda Dinh
(74) *Attorney, Agent, or Firm* — Hemisphere Law, PLLC; Zhigang Ma

(57) ABSTRACT

A segmented Kalman filter based anti-transient-impact-vibration-interference signal processing method and system for a vortex flowmeter with a microcontroller as a core are provided, which relate to a flow rate measurement field. The method includes: (1) seeking for data segments containing transient impact vibration interferences, (2) configuring a Kalman filter, (3) implementing Kalman filtering in segments, (4) analyzing frequency domain amplitude spectrum. A vortex flow signal is predicted and estimated by the Kalman filter to achieve an objective of reducing powers and proportions of transient impact vibration interferences. Even when multiple transient impact interference components exist, and powers of these interferences are larger than the power of the vortex flow signal, the interferences can still be eliminated to correctly extract a frequency of the vortex flow signal, as well as ensuring measurement accuracy of the vortex flowmeter under complicated working process.

5 Claims, 5 Drawing Sheets

(56) References Cited

FOREIGN PATENT DOCUMENTS

| | | | |
|---|---|---|---|
| CN | 104729591 | A | 6/2015 |
| CN | 105181031 | A | 12/2015 |
| CN | 104729591 | B | 9/2017 |
| JP | 08226836 | A | 9/1996 |
| JP | 2003149023 | A | 5/2003 |
| WO | 90/04230 | A1 | 4/1990 |
| WO | 2017143649 | A1 | 8/2019 |

OTHER PUBLICATIONS

IEEE Transactions on Instrumentation and Measurement, vol. 63, No. 6, Jun. 2014, Frequency-Variance Based Antistrong Vibration Interference Method for Vortex Flow Sensor,Chun-Li Shao, Ke-Jun Xu, and Min Fang.

A Dissertion Submitted to Hefei University of Technology for the Degree of Doctor of Philosophy,Study on Signal Processing Methods of Digital Vortex Flowmeter for Rejecting Strong Vibration Disturbance and Implementation of Low Power,Luo Qinglin.

JournalofVibrationandShock, vol. 28 No. 3 2009, Experimental study on measuring accuracy of a vortex flowmeter under pipe vibration,Juan Xing, Tao Zhang, Song Hao.

Flow Measurement and Instrumentation 11 (2000) 41-49, Response of a vortex flowmeter to impulsive vibrations, J.J. Miau, C.C. Hu, J.H. Chou.

Jour nal of China Jiliang University, vol. 16 No. 4 Dec. 2005, Research on the sensor of vortex flowmeter with high interference resistant, Pan Lan, Song Kai cheng, Xu Guo liang.

IEEE Transactions on Signal Processing, vol. 57, No. 9, Sep. 2009, Fast Kernel-Based Independent Component Analysis, Hao Shen, Member, IEEE, Stefanie Jegelka, and Arthur Gretton.

IEEE Transactions on Biomedical Engineering, vol. 57, No. 9, Sep. 2010, Source Separation From Single-Channel Recordings by Combining Empirical-Mode Decomposition and Independent Component Analysis, Bogdan Mijovic, Student Member, IEEE, Maarten De Vos, Member, IEEE, Ivan Gligorijevic, Joachim Taelman, Member, IEEE, and Sabine Van Huffel, Fellow, IEEE.

Mechanical Systems and Signal Processing 19 (2005) 1166-1180, Blind separation of vibration components: Principles and demonstrations, Jerome Antoni.

* cited by examiner

KALMAN FILTER BASED ANTI-TRANSIENT-IMPACT-VIBRATION-INTERFERENCE SIGNAL PROCESSING METHOD AND SYSTEM FOR VORTEX FLOWMETER

TECHNICAL FIELD

The disclosure relates to a flow rate measurement technical field, which is a Kalman filter based anti-transient-impact-vibration-interference signal processing method and system for a vortex flowmeter, and more particularly to a segmented Kalman filter and periodic spectrum analysis based anti-transient-impact-vibration-interference signal processing method and system for a vortex flowmeter with a microcontroller unit (MCU) as a core.

DESCRIPTION OF RELATED ART

A vortex flowmeter has advantages such as a long service life, a large measuring range without mechanically movable components and the like, and applicable to a variety of media, including liquids, gases and saturated steam, which has been widely used in process industries. However, the vortex flowmeter is a kind of flowmeters based on the principle of fluid vibration, composed of a vortex generator, a vortex flow sensor and a signal processing system. The vortex flow sensor is sensitive to pipeline vibration, when the power of vibration noise is greater than that of flow signal, it is difficult for the conventional spectrum analysis method based on the dominance of flow amplitude to exclude the interference, which will affect the measurement accuracy of the vortex flowmeter. Therefore, a difficulty of the vortex flowmeter in processing signals is how to extract vortex flow signals from mixed signals containing the intense vibration interferences. The pipeline vibration interference can be classified to be periodical sinusoidal vibration interference and transient impact vibration interference.

The periodic sinusoidal vibration interference is mainly generated by mechanical vibration of devices such as motors, air pumps and water pumps in the industrial fields. Each vibration source produces vibration interference with a fixed-frequency. When this vibration interference exists, the vortex flow sensor outputs a stationary signal superimposed by multiple sine signals with different frequencies. Aiming at the periodical sinusoidal vibration interference, domestic and international scholars have done a great deal of research and have achieved some results in resisting periodical sinusoidal vibration interference (L. Gerald Schlatter, Douglas William Barrett, F. John Waers, H. Lee Gilbert, and J. Mark Elder. Signal processing method and apparatus for flowmeters. International Patent, WO90/04230, Apr. 19, 1990; C.-L. Shao, K.-J. Xu, and M. Fang. Frequency-Variance Based Antistrong Vibration Interference Method for Vortex Flow Sensor [J]. IEEE Trans. on Instrumentation and Measurement, 2014, 63(6): 1566-1582; Qinglin Luo. Study on Signal Processing Methods of Digital Vortex Flowmeter for Rejecting Strong Vibration Disturbance and Implementation of Low Power [D]. Hefei University of Technology, 2010; Juan Xing, Tao Zhang, Song Hao. Experimental study on measuring accuracy of a vortex flowmeter under pipe vibration [J]. Journal of vibration and shock, 2009, 28(3):112-115).

The transient impact vibration interference is mainly caused by knocking pipeline, flow shock, cavitation shock and pulsation shock. When the pipeline system suffers the transient impact, the amplitude of signals output by the vortex flow sensor will suddenly increase and then gradually attenuate to a steady state. The results of the spectrum analysis show that the transient impact will generate multiple interference frequency components, and the power of one or more interference components even can exceed the power of flow signal. Few research has been done on anti-transient-impact-vibration-interference for the vortex flowmeter around the world. Some scholars improved the structure of vortex flow sensor to enhance the ability of resisting the transient impact vibration interference (J. J. Miau, C. C. Hu, J. H. Chou. Response of a vortex flowmeter to impulsive vibrations [J]. Flow Measurement and Instrumentation, 2000(11):41-49; Lan Pan, Kaichen Song, Guoliang Xu. Research on the sensor of vortex flowmeter with high interference resistant [J]. Journal of China Jiliang University, 2005, 16(4): 268-270, 278). However, when continual or relatively strong transient impacts occur, the vortex flowmeter still may make a mistake on measurement. Aiming at mechanical impact, some scholars proposed the blind source separation algorithm, which had some effects on separating transient impact vibration interference (S. Hao, S. Jegelka, and A. Gretton. Fast Kernel-Based Independent Component Analysis [J]. IEEE Trans. on Signal Processing, 2009, 57(9):3498-3511; B. Mijović, M. D. Vos, I. Gligorijević, J. Taelman, and S. V. Huffel. Source separation from single-channel recordings by combining empirical-mode decomposition and independent component analysis [J]. IEEE Trans. on Biomedical Engineering, 2010, 57(9):2188-2196; J. Antoni. Blind separation of vibration components: Principles and demonstrations [J]. Mechanical Systems and Signal Processing, 2005, 19(6): 1166-1180). However, the computation load of the blind source separation algorithm is considerable, which cannot satisfy requests of real-time processing in need for vortex flowmeter in low-power mode. China patent (Ke-Jun Xu, Bao-Hong Ren, Chun-Li Shao, Min Fang, Zhang-Ping Shu. Signal processing method for vortex flowmeter for resisting low-frequency strong transient impact vibration based on data replacement, application of invention patent, ZL201510021818.6) published a signal processing method for vortex flowmeter for resisting strong transient impact vibration. An initial point of knocking vibration and a replacement data segment are looked for, then data with knocking vibration interferences are replaced by the reverse replacement data through mirror duplication along two directions of right and left to eliminate strong knocking vibration interferences.

SUMMARY

The problem to be solved by the disclosure is as follows. When transient impact vibration interferences exist, there are multiple interference frequency components in the output signal of the vortex flow sensor, and most of them are in the frequency range of vortex flow signals, and powers of the interference components are larger than those of flow signals. At present, the blind source separation algorithm cannot be implemented in real-time by a low-power vortex flowmeter. Bandpass filtering or adaptive notch is not adapted for filtering with this type of strong interferences. The spectrum analysis based on the dominance of flow amplitude may also lead to an erroneous result. Therefore, the vortex flowmeter needs an effective digital signal processing method to resist transient impact vibration interferences.

The technical solution of the disclosure is as follows. A set of data output by the vortex flow sensor are monitored in sections to seek for data segments containing transient impact vibration interferences. The data segments are processed by Kalman filtering in segments to reduce powers and proportions of the transient impact vibration interferences. The proportion is an amplitude ratio of the maximum interference component generated by transient impacts in the data segments to the vortex flow signal. The power of flow signal in the set of data output by the vortex flow sensor after filtering is thereby maximized, which means the power of vortex flow signal is dominant on the whole. The whole set of data are processed by analyzing frequency domain amplitude spectrum, and a frequency corresponding to the maximum peak in the amplitude spectrum is selected to be the frequency of the vortex flow signal.

The specific technical solution is as follows.

The disclosure processes signals output by the vortex flow sensor to reduce powers and proportions of the transient impact vibration interferences. First, the signals output by the vortex flow sensor are monitored, and a mutation threshold is set up by comparing peak values in segments. The data segments containing transient impact vibration interferences are searched for according to the pattern that the amplitude of transient impact increasing abruptly, then attenuating gradually to a stable state. Subsequently, variables and parameters of the Kalman filters are configured to predict and estimate the vortex flow signal. The Kalman filters are implemented to filter the data segments respectively to reduce the powers and the proportions of the transient impact vibration interferences in the data segments, making the power of the vortex flow signal dominant on the whole. Finally, the frequency of the vortex flow signal is extracted by analyzing frequency domain amplitude spectrum. Specific steps of the Kalman filter based anti-transient-impact-vibration-interference signal processing method for a vortex flowmeter are as follows.

(1) Seeking for Data Segments Containing Transient Impact Vibration Interferences First, signals output by the vortex flow sensor are collected, and 2060-point sampling data are divided equally. A mutation threshold Vth is calculated according to the maximum peak-to-peak values of each of the data segments. The amplitudes of the signal are compared with the mutation threshold to search for initial data segments containing the transient impact vibration interferences, and the number of continued segments N for each transient impact is counted. The initial points of transient impacts are sought, and the data segments containing the transient impact vibration interferences are stored.

(2) Configuring the Kalman Filter

The Kalman filter is adopted to predict and estimate the vortex flow signal. The vortex flow signal is defined as a state variable, each data segment containing the transient impact vibration interference is defined as an observed variable, and each transient impact vibration interference is defined as an observed noise.

No control parameter is present for vortex flowmeter in working process, therefore, the control input variable of k-time $U_k=0$ and the coefficient B=0.

The vortex flow signal is a stable sine signal in normal working process, the present vortex flow signal can be predicted by the vortex flow signal of the last moment and an interference noise, and the process noise represents the interference noise. Therefore the coefficient A=1, the coefficient G=1.

A data segment to be filtered consists of the transient impact vibration interference by the vortex flow signal, therefore the coefficient H=1. As the powers of transient impact vibration interferences are generally larger than a power of the flow signal, in order to reduce the proportions of the transient impact vibration interferences, according to verification of a great amount of experimental data, the computational formula of D is set to be $$D = \sqrt{\frac{\max(PPV)}{\min(PPV)}}$$

where max(PPV) is the maximum value of 20 peak-to-peak values, min(PPV) is the minimum value of 20 peak-to-peak values. In addition, the computational formula of the variance of observed noise is $$S^2 = \frac{\sum_{i=1}^{T}(Y_i - \overline{Y})^2}{T-1}$$

where $S^2$ is the variance, T is the number of points in each data segment to be filtered, $Y_i$ is the present observed variable value, and $\overline{Y}$ is the mean value of T observed variable values.

(3) Implementing Kalman Filtering in Segments

Each of the data segments containing transient impact vibration interferences is divided into two equal subsections, the variance of the observed noise of each of the subsections is calculated, and each of the subsections is processed by Kalman filtering. While the other data segments without transient impact vibration interferences stay the same.

(4) Analyzing Frequency Domain Amplitude Spectrum

Filtering in segments efficiently reduces powers and proportions of the transient impact vibration interferences to make power of the vortex flow signal dominant on the whole. Then filtered sampling data are processed by analyzing the frequency domain amplitude spectrum, and a frequency corresponding to the maximum peak value in the frequency domain amplitude spectrum is searched as the frequency of the vortex flow signal.

The advantage of the disclosure is as follows. The disclosure adopts the segmented Kalman filter based digital signal processing method to subtly switch the objective of reducing powers and proportions of the transient impact vibration interferences to prediction and estimation of vortex flow signals. Even when multiple transient impact vibration interference components exist, and the powers of these interference components are larger than the power of the vortex flow signal, the noises can still be eliminated, and the frequency of the vortex flow signal can be extracted correctly to ensure measurement accuracy of the vortex flowmeter under complicated working process.

DETAILED DESCRIPTION OF PREFERRED EMBODIMENTS

A Kalman filter based anti-transient-impact-vibration-interference signal processing system for a vortex flowmeter comprises hardware of the Kalman filter based anti-transient-impact-vibration-interference signal processing system and software of the Kalman filter based anti-transient-impact-vibration-interference signal processing system. The disclosure will be described in detail with reference to the accompanying drawings as follows.

Figure 1:
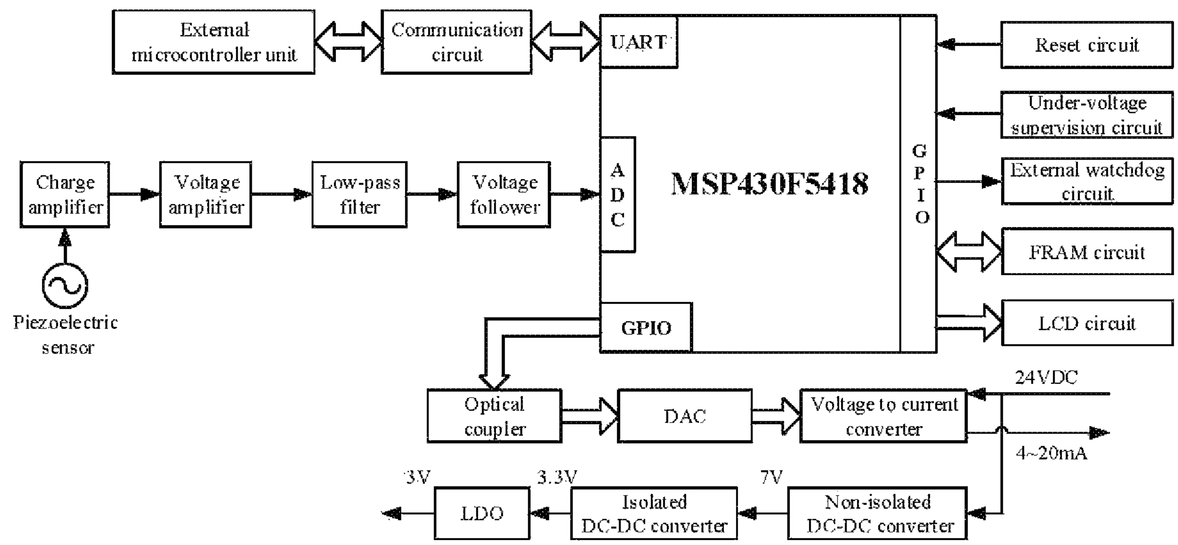
FIG. 1 is a block diagram of a hardware structure of a signal processing system in a vortex flowmeter.

A block diagram of the hardware structure of the Kalman filter based anti-transient-impact-vibration-interference signal processing system for the vortex flowmeter is shown in FIG. 1. An MSP430F5418 microcontroller is used as a core; these resources of MSP430F5418—general purpose input output (GPIO), analog to digital converter (ADC) and universal asynchronous receiver/transmitter (UART)—are used to connect with external circuits; external circuits involve an external microcontroller unit, a communication circuit, a charge amplifier, a voltage amplifier, a low-pass filter, a voltage follower, an optical coupler, a digital to analog converter (DAC), a voltage to current converter, a non-isolated DC-DC converter, an isolated DC-DC converter, a low dropout regulator (LDO), a reset circuit, an under-voltage supervision circuit, an external watchdog circuit, a ferroelectric random access memory (FRAM) circuit and a liquid crystal display (LCD) circuit. The hardware of the system of the disclosure mainly comprises a forward input conditioning circuit module, a digital signal processing module, a system output module and a power conversion circuit module. The forward input conditioning circuit module consists of the charge amplifier, the voltage amplifier, the low-pass filter and the voltage follower. The digital signal processing module consists of the MSP430F5418 microcontroller, the under-voltage supervision circuit, the reset circuit, the FRAM circuit and the external watchdog circuit. The system output module consists of the communication circuit, the external microcontroller unit, the optical coupler, the DAC, the voltage to current converter and the LCD circuit. The power conversion circuit module consists of the non-isolated DC-DC converter, the isolated DC-DC converter and the LDO, it converts 24VDC into 3VDC.

The vortex flow sensor is a piezoelectric sensor. The piezoelectric sensor converts a vortex flow signal to an electrical signal to be output; the electrical signal is amplified and filtered by the charge amplifier, the voltage amplifier, the low-pass filter and the voltage follower, and enters the ADC in the MSP430F5418 microcontroller, then the electrical signal is sampled by the ADC and converted to be a digital signal. The MSP430F5418 microcontroller processes the digital signal by the Kalman filter based anti-transient-impact-vibration-interference signal processing method (such as an algorithm) to obtain the frequency of the vortex flow signal, further to achieve the fluid flow rate. Subsequently, the frequency of the vortex flow signal and the flow rate are displayed on the LCD in real-time by the system output module.

Figure 2:
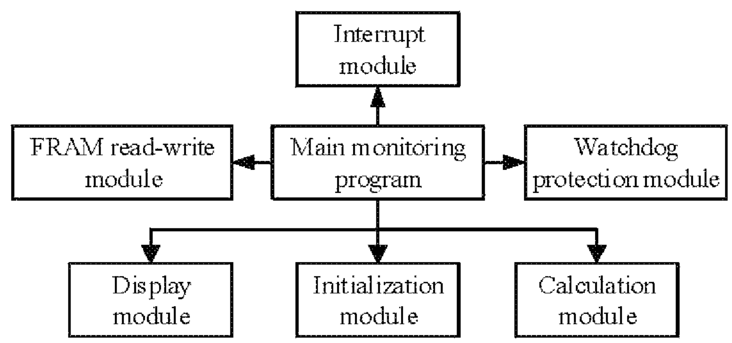
FIG. 2 is a block diagram of a software structure of a signal processing system in a vortex flowmeter.

A block diagram of the software structure of the Kalman filter based anti-transient-impact-vibration-interference signal processing system for the vortex flowmeter is shown in FIG. 2. The software of the system of the disclosure adopts modularization design, which is controlled by a main monitoring program. The software of the system mainly includes the main monitoring program, an initialization module, an interrupt module, a calculation module, a watchdog protection module, an FRAM read-write module and a display module.

Figure 3:
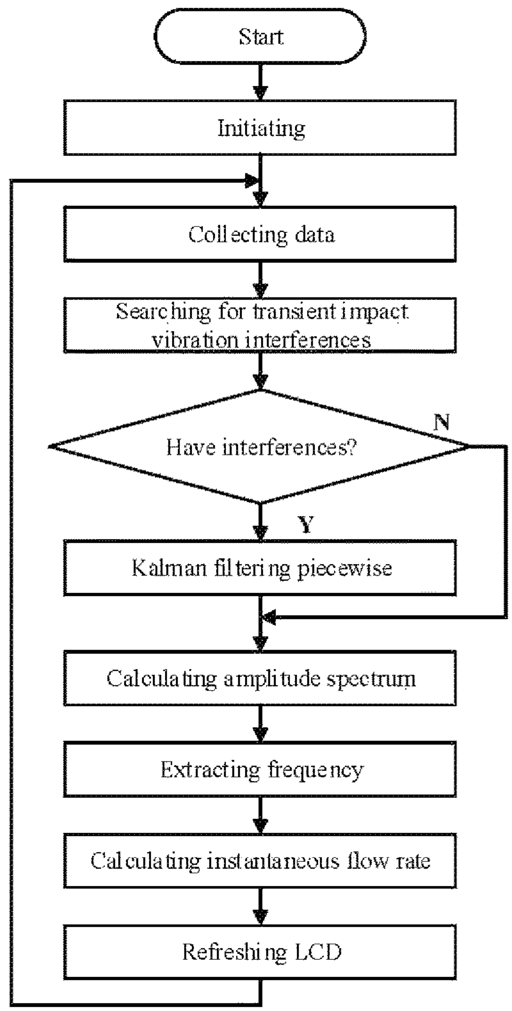
FIG. 3 is a flowchart of a main monitoring program of a signal processing system in a vortex flowmeter.

A flowchart of the main monitoring program of the Kalman filter based anti-transient-impact-vibration-interference signal processing system for the vortex flowmeter is shown in FIG. 3. The operational process of the signal processing system of the vortex flowmeter of the disclosure is: powering the system, initiating and setting up each required module, collecting 2060-point latest data sampled by the ADC; searching for transient impact vibration interferences in the data in segments; if the interferences exist, processing data segments containing transient impact vibration interferences by Kalman filtering piecewise to reduce powers and proportions of the transient impact vibration interferences; if no interference exists, ignoring this step; calculating the amplitude spectrum of the latest processed 2048-point data, then extracting the frequency corresponding to the present vortex flow signal, calculating an instantaneous flow rate according to the frequency; subsequently, refreshing the LCD to display the frequency of the present vortex flow rate; then the main monitoring program is returned to enter a new round of recycling.

Figure 4:
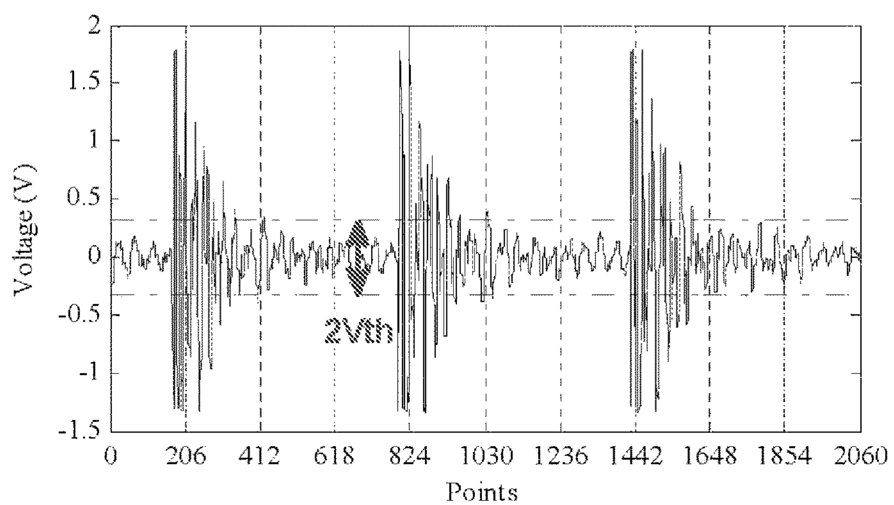
FIG. 4 is a time domain waveform of a signal output by a vortex flow sensor.
Figure 5:
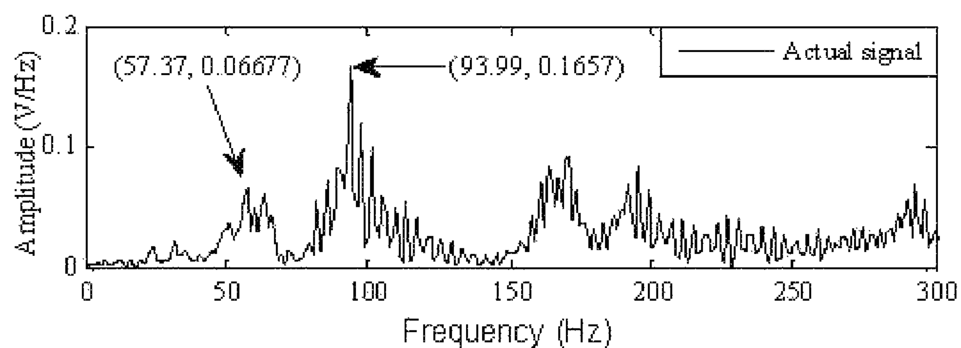
FIG. 5 is a frequency domain amplitude spectrum of a signal output by a vortex flow sensor.

The disclosure illustrates the specific method of resisting transient impact vibration interferences on the basis of a set of data shown in FIG. 4. When the frequency of a given gas flow signal is about 57 Hz, the time domain waveform of the latest 2060-point data output by the vortex flow sensor is shown in FIG. 4. At the moment, the data contains transient impact vibration interferences, the amplitude spectrum of the latest 2048-point data is shown in FIG. 5. The maximum peak (93.99 Hz, 0.1657V) in FIG. 5 is the peak of an interference component of the transient impact, and the amplitude thereof is overly larger than the amplitude of the peak point (57.37 Hz, 0.06677V) corresponding to the gas flow signal. If the amplitude spectrum signal processing method based on the dominance of amplitude is adopted, the interference component of 93.99 Hz will be extracted as the vortex flow frequency to be output, then incorrect flow information will be achieved.

Figure 6:
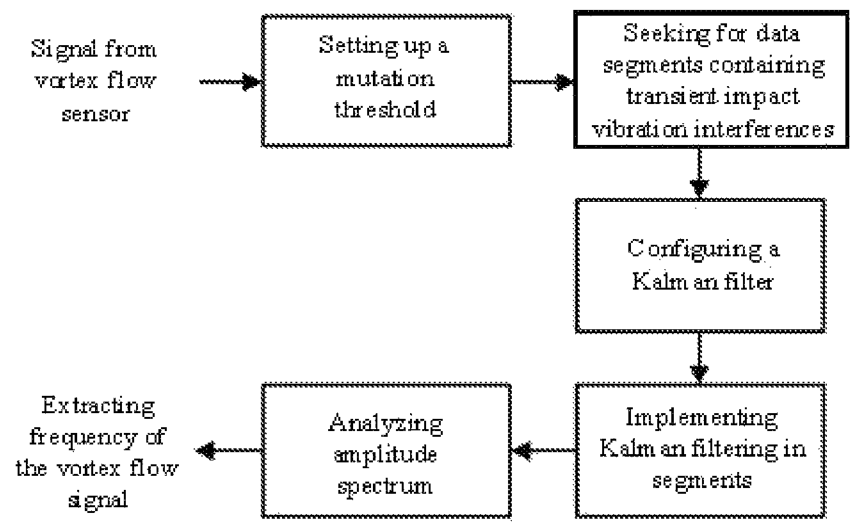
FIG. 6 is a schematic block diagram of a Kalman filter based anti-transient-impact-vibration-interference algorithm.

A block diagram of anti-transient-impact-vibration-interference algorithm of the disclosure is shown in FIG. 6. The digital signal is processed by the Kalman filter based anti-transient-impact-vibration-interference signal processing method to reduce powers and proportions of the transient impact vibration interferences. First, the electrical signal output by the vortex flow sensor is monitored, and a mutation threshold is set up by comparing peak values in segments. The data segments containing transient impact vibration interferences are sought out based on the characteristic that amplitudes of the transient impact vibration interferences increasing abruptly, then attenuating gradually to a steady state. Subsequently, variables and parameters of the Kalman filters are configured to predict and estimate the vortex flow signal. The Kalman filters are implemented to filter the data segments containing the transient impact vibration interferences in segments individually to reduce powers and proportions of the transient impact vibration interferences in the data segments, making the power of the vortex flow signal dominant on the whole. Finally, the frequency of the vortex flow signal is extracted by analyzing frequency domain amplitude spectrum. The Kalman filter based anti-transient-impact-vibration-interference signal processing method implemented by the Kalman filter based anti-transient-impact-vibration-interference signal processing system comprises following processing steps.

(1) Seeking for Data Segments Containing Transient Impact Vibration Interferences The mutation threshold is set up as the double arrow shown in FIG. 4. Firstly 2060-point sampling data are divided into 20 sections equally, and each section includes 103-point data. A maximum value and a minimum value of each section are searched, then a difference of these two values (peak-to-peak value) is calculated. A mean value of three minimum peak-to-peak values of the 20 sections is set to be the mutation threshold Vth. Data segments whose absolute values are larger than Vth among extremums that include the maximum values and the minimum values are searched out and stored from the first section.

According to a great deal of experimental data analyses, there are two main sorts of features for the initial data segments containing transient impact vibration interferences. One sort: in the current segment, only one extreme whose absolute value is greater than Vth exists; there is no adjacent peak after this extreme; in the next segment, the absolute values of positive extreme and negative extreme are greater than Vth. The other sort: the absolute values of positive extreme and negative extreme are greater than Vth in the current segment.

Figure 7:
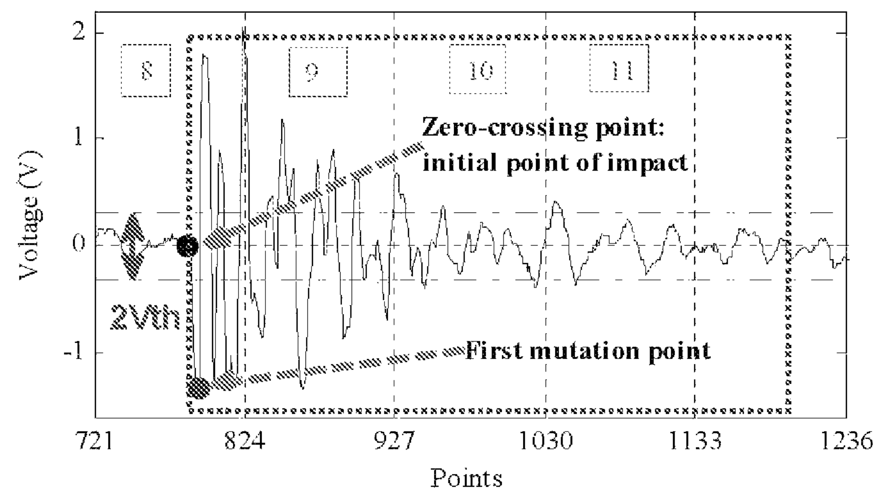
FIG. 7 is a schematic diagram of seeking data segments containing transient impact vibration interferences.

A schematic diagram of seeking data segments containing transient impact vibration interferences is shown in FIG. 7. The initial data segments with transient impact vibration interferences are searched out according to the two sorts of features above, and the number of continued segments N for each impact is counted. The eighth segment shown in FIG. 7 is the initial data segment of the transient impact, and the absolute values of extremes are greater than Vth in the adjacent ninth segment, the tenth segment and the eleventh segment, so that the four segments of data belong to one transient impact, which indicates N=4. The above method of searching for data segments containing transient impact vibration interferences can basically exclude glitches, but it still needs to distinguish the condition of the flow rate increase. The flow rate can be supposed to be increased as long as the following conditions are satisfied simultaneously according to comprehensive consideration of response speed of the system and accuracy of extraction of the vortex flow signals. The conditions are that there is only one amplitude mutation in 2060-point sampling data; the absolute value of the extremum in the last segment is larger than Vth; N≥10, that is, at least half of the data belong to the condition of the flow rate increase.

After confirming existence of transient impact vibration interferences, an extremum point first to exceed the mutation threshold in the initial data segment is searched to be the first mutational point, such as the point with an abscissa that is 792 in FIG. 7. The first zero-crossing point in the left side of the first mutational point is as the initial point of the transient impact, such as the point corresponding to an abscissa of 785 in FIG. 7. The initial point and 103*N points after the initiative point are saved. These points are the data segment containing transient impact vibration interference, as the data segment [785, 1197] included in the dashed box shown in FIG. 7.

(2) Configuring a Kalman Filter

The mathematical formulas of the Kalman filter are described by the concept of state space, including a state equation describing state variables (Eq. (1)) and an observation equation describing observed variables (Eq. (2)).

$$X_{k+1}=AX_k+BU_k+Gw_k \tag{1}$$

$$Y_{k+1}=HX_{k+1}+Dv_{k+1} \tag{2}$$

where $X_k$ is a state variable of k-time, $X_{k+1}$ is a state variable of (k+1)-time, $U_k$ is a control input variable of k-time, $Y_{k+1}$ is an observed variable of (k+1)-time, A, B, D, G and H are known coefficients. $w_k$ and $v_{k+1}$ are a process noise and an observed noise, respectively. Meanwhile, $w_k$ and $v_{k+1}$ are mutual substantive Gaussian white noises; mean values of noises thereof are $\overline{w}$ and $\overline{v}$, respectively; variances are Q and R, respectively. A specific configuration method will be introduced by combining with concrete applications in the following.

The disclosure switches the objective of reducing powers and proportions of the transient impact vibration interferences to prediction and estimation of vortex flow signals subtly. Variables and parameters of a discrete Kalman filter will be set up as follows; the signal output by the vortex flow sensor shown in FIG. 4 is taken as an example to predict and estimate the vortex flow signal. First, the vortex flow signal is defined as the state variable, and each data segment containing the transient impact vibration interference is defined as the observed variable. Each transient impact vibration interference is defined as the observed noise. The process has no control parameters, therefore, the control input variable $U_k$=0, and the coefficient B=0. The vortex flow signal belongs to a stable sine signal in the normal working process. The present vortex flow signal can be predicted by the vortex flow signal of the last moment and the interference noise, and the process noise represents the interference noise. Then the coefficient A=1 and the coefficient G=1. The mean value $\overline{w}$ of the process noise $w_k$ equals to zero, and the variance Q of the process noise can be approximated by the variance of the vortex flow signal, therefore, Q is approximately 0.05 for the waveform shown in FIG. 4.

The data segment to be filtered consists of the transient impact vibration interference and the vortex flow signal, therefore the coefficient H is set to be 1. As the powers of transient impact vibration interferences are generally larger than the power of the vortex flow signal, in order to reduce the proportions of the transient impact vibration interferences, according to verification of a great amount of experimental data, the computational formula of D is set as Eq. (3). When the flow rate is zero or closed to the inferior limitation, the influence of transient impact vibration interferences on the vortex flowmeter is maximal. In order to ensure effectiveness of the Kalman filter based algorithm, the value of D can be increased appropriately. D equals to 5.48 for the waveform shown in FIG. 4

$$D=\sqrt{\frac{\max(PPV)}{\min(PPV)}} \tag{3}$$

where max(PPV) is the maximum value of 20 peak-to-peak values, min(PPV) is the minimum value of 20 peak-to-peak values. In addition, the mean value $\overline{v}$ of the observed noise $v_k$ equals to zero and the variance R of the observed noise can be approximated by the variance of each data segment containing transient impact vibration interference, the computational formula thereof is, $$S^2 = \frac{\sum_{i=1}^{T} (Y_i - \overline{Y})^2}{T - 1} \quad (4)$$

where $S^2$ is the variance, T is the number of points in each data segment to be filtered, $Y_i$ is the present observed variable value, and $\overline{Y}$ is the mean value of T observed variable values.

An initial state variable $X_{0|0}$ is assigned to the sample value of the initial point. The initial covariance of the predictive error $P_{0|0}$ is set to be 1.

(3) Implementing Kalman Filtering in Segments

Figure 8:
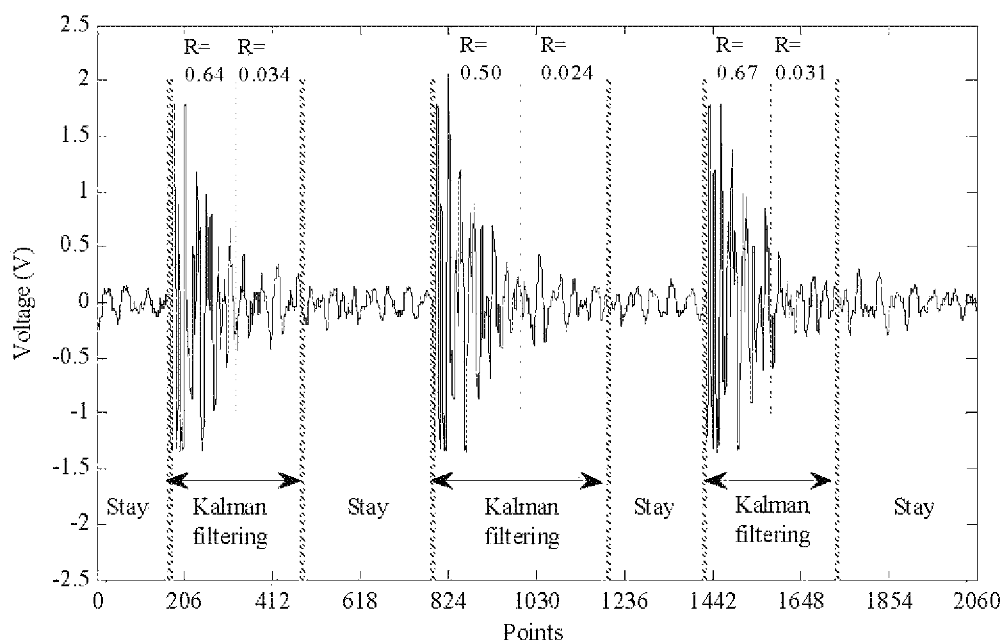
FIG. 8 is a schematic diagram of processing Kalman filtering in segments.

A schematic view of processing Kalman filtering in segments is shown in FIG. 8. The waveform shown in FIG. 4 includes three transient impact vibration interferences. The data segments containing transient impact vibration interferences are [172, 481], [785, 1197] and [1424, 1733], respectively, shown as the ranges indicated by the double arrows in FIG. 8. These three data segments include not only the transient impact vibration interferences, but also the vortex flow signals. Therefore, when the data segments are processed by Kalman filtering, the power of the vortex flow signals included in the segments will also be declined. However, each of these data segments containing the transient impact vibration interferences includes an amplitude mutation section and an oscillation attenuation section. In order to reduce the power of the transient impact vibration interference and the attenuation of the vortex flow signal as much as possible, according to verifications of a large amount of experimental data, the disclosure divides each of the data segments containing transient impact vibration interferences into two equal parts to be processed by Kalman filtering, respectively, and the boundaries are shown as the shorter dotted lines in FIG. 8. The former part is approximately the amplitude mutation section, and the latter part is approximately the oscillation attenuation section. The three data segments containing transient impact vibration interferences to be filtered are divided into six parts. Only the six parts of data are processed by Kalman filtering, and data out of the six parts stay the same. Variances R of the six parts of data are calculated, respectively, and the six parts of data are processed by Kalman filtering in sequence.

Figure 9:
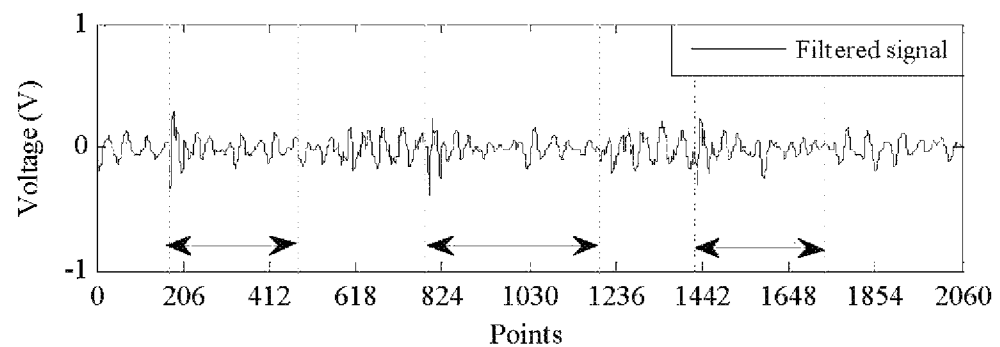
FIG. 9 is a time domain waveform of a signal output by a vortex flow sensor after Kalman filtering in segments.

A time domain waveform of the signal output by the vortex flow sensor after Kalman filtering in segments is shown in FIG. 9. It can be seen from comparing the time domain waveforms in FIG. 4 and FIG. 9 that the process of segmented Kalman filtering reduces the powers of transient impact vibration interferences efficiently.

(4) Analyzing Frequency Domain Amplitude Spectrum

Figure 10:
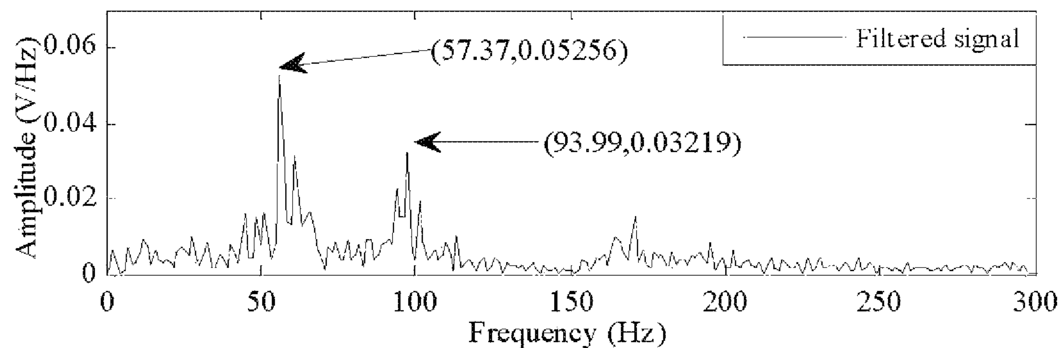
FIG. 10 is a frequency domain amplitude spectrum of a signal output by a vortex flow sensor after Kalman filtering in segments.

The filtered data shown in FIG. 9 are processed by spectrum analysis. The latter 2048-point data in the 2060-point data are selected, and the amplitude spectrum of the filtered data is achieved shown in FIG. 10. The peak point of the gas flow signal in the amplitude spectrum is (57.37 Hz, 0.05256V), and the peak point corresponding to the maximum interference component of the transient impact vibration is (93.99 Hz, 0.03219V). It can be seen from comparing the frequency domain amplitude spectra in FIG. 5 and FIG. 10 that the amplitudes of several interference components are larger than the amplitude of the flow signal before filtering due to the interference of the transient impact vibration, and the powers of interference components are reduced significantly after filtering to make the power of the vortex flow signal is dominant on the whole. The maximum peak in the amplitude spectrum at the moment is selected to be the peak corresponding to the vortex flow signal.

In the normal working process, when the transient impact vibration interference is absent, the power of the vortex flow signal is dominant, therefore, the maximum peak in the amplitude spectrum is the peak of the vortex flow signal. When the transient impact vibration interference is present, the signal processing method shown in FIG. 6 is adopted. The data segments containing transient impact vibration interferences are searched out first. Then the variables and the parameters of the Kalman filters are set up to process the data segments individually to reduce powers and the proportions of the transient impact vibration interferences, which basically can achieve the effect that the power of the vortex flow signal is dominant on the whole. The maximum peak in the amplitude spectrum at the moment is selected to be the peak corresponding to the vortex flow signal.

What is claimed is:

1. A Kalman filter based anti-transient-impact-vibration-interference signal processing system for a vortex flowmeter, comprising: a forward input conditioning circuit module, a digital signal processing module, a system output module, and a power conversion circuit module;

a vortex flow sensor converts a vortex flow signal to electrical signal as output signal, wherein the electrical signal is amplified and filtered by a charge amplifier, a voltage amplifier, a low-pass filter, and a voltage follower inputting to an analog to digital converter (ADC) in a microcontroller, and the electrical signal is sampled by the ADC and converted as digital signal;

the microcontroller processes the digital signal by a Kalman filter based anti-transient-impact-vibration-interference signal processing method to obtain a frequency of the vortex flow signal, and achieve a fluid flow rate;

and the frequency of the vortex flow signal and the fluid flow rate are displayed on a liquid crystal display (LCD) in real-time by the system output module;

wherein, the Kalman filter based anti-transient-impact-vibration-interference signal processing method comprises:

(1) seeking for data segments containing transient impact vibration interferences;

(2) configuring a Kalman filter;

(3) implementing Kalman filtering in segments; and (4) analyzing frequency domain amplitude spectrum;

wherein, the configuring the Kalman filter comprises:

$$X_{k+1} = AX_k + BU_k + Gw_k \quad (1)$$

$$Y_{k+1} = HX_{k+1} + Dv_{k+1} \quad (2)$$

where the vortex flow signal is defined as a state variable, $X_k$ is the state variable of k-time, and $X_{k+1}$ is the state variable of (k+1)-time;

each data segment containing a transient impact vibration interference is defined as an observed variable, and $Y_{k+1}$ is the observed variable of (k+1)-time;

each transient impact vibration interference is defined as an observed noise, and $v_{k+1}$ is the observed noise of (k+1)-time;

wherein no control parameter is present, a control input variable of k-time $U_k=0$, and a coefficient B=0;

wherein the vortex flow signal is a stable sine signal in a normal working process, a present vortex flow signal is predicted by the vortex flow signal of a last moment and an interference noise, and a process noise represents the interference noise, $w_k$ is the process noise of k-time, a coefficient A=1, and a coefficient G=1;

wherein the data segment to be filtered consists of the transient impact vibration interference by the vortex flow signal, and a coefficient H=1; and wherein a computational formula of D is set to be $$D = \sqrt{\frac{\max(PPV)}{\min(PPV)}} \tag{3}$$

where max (PPV) is a maximum value of 20 peak-to-peak values, min (PPV) is a minimum value of 20 peak-to-peak values;

a computational formula of the variance of the observed noise is $$S^2 = \frac{\sum_{i=1}^{T} (Y_i - \overline{Y})^2}{T - 1} \tag{4}$$

where $S^2$ is the variance, T is the number of points in each data segment to be filtered, $Y_i$ is a present observed variable value, $\overline{Y}$ is a mean value of T observed variable values.

2. The Kalman filter based anti-transient-impact-vibration-interference signal processing system for the vortex flowmeter according to claim 1, wherein the digital signal is processed by the Kalman filter based anti-transient-impact-vibration-interference signal processing method to reduce powers and proportions of transient impact vibration interferences;

wherein the electrical signal output by the vortex flow sensor is monitored, a mutation threshold is set up by comparing peak values in segments, the data segments containing the transient impact vibration interferences are sought out based on a characteristic that amplitudes of the transient impact vibration interferences increasing and attenuating gradually to a steady state;

subsequently, variables and parameters of Kalman filters are configured to predict and estimate the vortex flow signal, the Kalman filters are implemented to filter the data segments containing the transient impact vibration interferences individually to reduce powers and the proportions of the transient impact vibration interferences in the data segments, making a power of the vortex flow signal dominant;

and the frequency of the vortex flow signal is extracted by analyzing frequency domain amplitude spectrum.

3. The Kalman filter based anti-transient-impact-vibration-interference signal processing system according to claim 1, wherein the seeking for data segments containing transient impact vibration interferences comprises:

collecting signals output by the vortex flow sensor, dividing 2060-point sampling data equally, calculating a mutation threshold Vth according to maximum peak-to-peak values of each of the data segments;

comparing amplitudes of the signals and the mutation threshold, searching for initial data segments containing the transient impact vibration interferences, and counting the number of continued segments N for each transient impact;

searching for initial points of the transient impacts, and storing the data segments containing the transient impact vibration interferences.

4. The Kalman filter based anti-transient-impact-vibration-interference signal processing system according to claim 1, wherein the implementing Kalman filtering in segments comprises:

dividing each of the data segments containing the transient impact vibration interferences into two equal subsections, calculating a variance of an observed noise of each of the subsections, and processing Kalman filtering for each of the subsections, other data segments without transient impact vibration interferences stay the same.

5. The Kalman filter based anti-transient-impact-vibration-interference signal processing system according to claim 1, wherein the analyzing frequency domain amplitude spectrum comprises:

processing filtered sampling data by analyzing the frequency domain amplitude spectrum, and searching for a frequency corresponding to a maximal peak value in the frequency domain amplitude spectrum to be the frequency of the vortex flow signal;

wherein filtering in segments efficiently reduces powers and proportions of the transient impact vibration interferences to make a power of the vortex flow signal dominant.

* * * * *